(12) United States Patent
Amine et al.

(10) Patent No.: US 9,012,096 B2
(45) Date of Patent: Apr. 21, 2015

(54) LONG LIFE LITHIUM BATTERIES WITH STABILIZED ELECTRODES

(75) Inventors: Khalil Amine, Downers Grove, IL (US); Jun Liu, Naperville, IL (US); Donald R. Vissers, Naperville, IL (US); Wenquan Lu, Darien, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1425 days.

(21) Appl. No.: 11/338,902

(22) Filed: Jan. 24, 2006

(65) Prior Publication Data
US 2006/0147809 A1    Jul. 6, 2006

Related U.S. Application Data

(63) Continuation-in-part of application No. 10/857,365, filed on May 28, 2004, now Pat. No. 7,968,235.

(60) Provisional application No. 60/647,361, filed on Jan. 26, 2005.

(51) Int. Cl.
| | | |
|---|---|---|
| *H01M 10/0567* | (2010.01) | |
| *H01M 10/0568* | (2010.01) | |
| *H01M 10/0569* | (2010.01) | |

(52) U.S. Cl.
CPC ...... *H01M 10/0567* (2013.01); *H01M 10/0568* (2013.01); *H01M 10/0569* (2013.01)

(58) Field of Classification Search
CPC .................. H01M 6/168; H01M 10/0567
USPC .......................................... 429/338, 341, 347
See application file for complete search history.

(56) References Cited

U.S. PATENT DOCUMENTS

| | | |
|---|---|---|
| 4,513,143 A | 4/1985 | Ng et al. |
| 4,857,423 A | 8/1989 | Abraham et al. |

(Continued)

FOREIGN PATENT DOCUMENTS

JP    75000095    1/1975

OTHER PUBLICATIONS

International Search Report for PCT Application No. PCT/US06/08664, dated Dec. 13, 2006.
Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

(Continued)

*Primary Examiner* — Tracy Dove
(74) *Attorney, Agent, or Firm* — Foley & Lardner LLP

(57) ABSTRACT

The present invention relates to non-aqueous electrolytes having electrode stabilizing additives, stabilized electrodes, and electrochemical devices containing the same. Thus the present invention provides electrolytes containing an alkali metal salt, a polar aprotic solvent, and an electrode stabilizing additive. In certain electrolytes, the alkali metal salt is a bis(chelato)borate and the additives include substituted or unsubstituted linear, branched or cyclic hydrocarbons comprising at least one oxygen atom and at least one aryl, alkenyl or alkynyl group. In other electrolytes, the additives include a substituted aryl compound or a substituted or unsubstituted heteroaryl compound wherein the additive comprises at least one oxygen atom. There are also provided methods of making the electrolytes and batteries employing the electrolytes. The invention also provides for electrode materials. Cathodes of the present invention may be further stabilized by surface coating the particles of the spinel or olivine with a material that can neutralize acid or otherwise lessen or prevent leaching of the manganese or iron ions. In some embodiments the coating is polymeric and in other embodiments the coating is a metal oxide such as $ZrO_2$, $TiO_2$, ZnO, $WO_3$, $Al_2O_3$, MgO, $SiO_2$, $SnO_2$ $AlPO_4$, $Al(OH)_3$, a mixture of any two or more thereof.

19 Claims, 10 Drawing Sheets

(56) References Cited

U.S. PATENT DOCUMENTS

| | | | |
|---|---|---|---|
| 5,487,959 A | 1/1996 | Koksbang | |
| 5,709,968 A | 1/1998 | Shimizu | |
| 5,731,106 A | 3/1998 | Tsutsumi et al. | |
| 5,763,119 A | 6/1998 | Adachi | |
| 5,824,434 A | 10/1998 | Kawakami et al. | |
| 5,849,432 A | 12/1998 | Angell et al. | |
| 5,858,573 A | 1/1999 | Abraham et al. | |
| 6,004,698 A | 12/1999 | Richardson et al. | |
| 6,045,952 A | 4/2000 | Kerr et al. | |
| 6,074,777 A | 6/2000 | Reimers et al. | |
| 6,207,326 B1 | 3/2001 | Kawakami et al. | |
| 6,232,021 B1 | 5/2001 | Negoro | |
| 6,291,107 B1 | 9/2001 | Shimizu | |
| 6,387,571 B1 | 5/2002 | Lain et al. | |
| 6,395,423 B1 | 5/2002 | Kawakami et al. | |
| 6,506,516 B1 | 1/2003 | Wietelmann et al. | |
| 6,780,545 B2 | 8/2004 | Birke-Salam et al. | |
| 6,787,268 B2 | 9/2004 | Koike et al. | |
| 6,841,303 B2 | 1/2005 | Park et al. | |
| 7,097,944 B2 * | 8/2006 | Murai et al. | 429/330 |
| 7,172,834 B1 | 2/2007 | Jow et al. | |
| 7,588,859 B1 * | 9/2009 | Oh et al. | 429/188 |
| 7,968,235 B2 | 6/2011 | Amine et al. | |
| 2001/0033964 A1 | 10/2001 | Heider et al. | |
| 2002/0039687 A1 | 4/2002 | Barker et al. | |
| 2003/0091892 A1 | 5/2003 | Watanabe et al. | |
| 2003/0118912 A1 | 6/2003 | Watanabe et al. | |
| 2003/0190529 A1 | 10/2003 | Kim et al. | |
| 2004/0013944 A1 | 1/2004 | Lee et al. | |
| 2004/0028996 A1 | 2/2004 | Hamamoto et al. | |
| 2004/0029017 A1 | 2/2004 | Besenhard et al. | |
| 2004/0121239 A1 | 6/2004 | Abe et al. | |
| 2004/0131934 A1 | 7/2004 | Sugnaux et al. | |
| 2004/0151951 A1 | 8/2004 | Hyung et al. | |
| 2004/0157126 A1 | 8/2004 | Belharouak et al. | |
| 2004/0191633 A1 | 9/2004 | Johnson et al. | |
| 2004/0214091 A1 | 10/2004 | Lim et al. | |
| 2005/0106470 A1 | 5/2005 | Yoon et al. | |
| 2005/0227143 A1 | 10/2005 | Amine et al. | |
| 2006/0147809 A1 | 7/2006 | Amine et al. | |
| 2006/0210883 A1 | 9/2006 | Chen et al. | |

OTHER PUBLICATIONS

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by The Chemical Society of Japan.

Amatucci, G.G. et al., "Failure Mechanism and Improvement of the Elevated Temperature Cycling of $LiMn_2O_4$ Coumpounds Through the Use of the $LiAl_xMn_{2-x}O_{4-z}F_z$ Solid Solution", *J. Electrochem. Soc.*, 2001, vol. 148, No. 2, pp. A171-A182, The Electrochemical Society, Inc.

Xu, W. et al., "Weakly Coordinating Anions, and the Exceptional Conductivity of their Nonaqueous Solutions," *Electrochemical and Solid-State Letters*, 2001, vol. 4, No. 1, pp. E1-E4, The Electrochemical Society, Inc.

Notice of Allowance Issued in U.S. Appl. No. 10/857,365 and mailed Feb. 23, 2011.

Non-final Office Action for U.S. Appl. No. 10/857,365 and mailed on Sep. 29, 2010.

Non-Final Office Action Issued in U.S. Appl. No. 13/116,559 and mailed May 15, 2012.

Final Office Action issued on U.S. Appl. No. 13/116,559, mailed Oct. 10, 2012.

Notice of Allowance issued in U.S. Appl. No. 13/116,559 and mailed Aug. 29, 2013.

Final Office Action for U.S. Appl. No. 10/857,365, dated Aug. 28, 2009.

Non-Final Office Action for U.S. Appl. No. 10/857,365, dated Jan. 29, 2010.

Non-Final Office Action for U.S. Appl. No. 10/857,365, dated Apr. 30, 2008.

Non-Final Office Action for U.S. Appl. No. 13/116,559 dated May 2, 2013.

* cited by examiner

LONG LIFE LITHIUM BATTERIES WITH STABILIZED ELECTRODES

CROSS-REFERENCES TO RELATED APPLICATIONS

This application is a continuation-in-part of pending U.S. patent application Ser. No. 10/857,365, filed May 28, 2004, the entire disclosure of which is incorporated herein by reference. This application also claims the benefit of U.S. Provisional Application No. 60/647,361 filed Jan. 26, 2005, the entire disclosure of which is incorporated herein by reference.

GOVERNMENT INTERESTS

This invention was made with Government support under Contract No. W-31-109-ENG-38 awarded by the Department of Energy. The Government has certain rights in this invention.

FIELD OF THE INVENTION

This invention relates to non-aqueous electrolytes comprising electrode stabilizing additives, stabilized electrodes and electrochemical devices containing the same. In particular, the invention relates to long life lithium batteries with stabilized spinel, olivine or other electrodes.

BACKGROUND

Lithium-ion batteries utilize carbon anodes, lithiated transition metal oxide cathodes, and an organic-based solvent electrolyte with a dissolved conducting salt such as lithium hexafluorophosphate ($LiPF_6$). These batteries currently dominate the battery market in the area of cellular phones, cam-recorders, computers, and other electronic equipment. However, attempts to apply these battery technologies to electric and hybrid vehicles have met with limited success. Problematic areas include safety, calendar life, cost, and, in the case of hybrid vehicles, high rate capability for power assist and regenerative braking.

Lithium-manganese-oxide-spinel-based electrodes have drawn enormous attention as a cathode material, since the Mn is less expensive compared to the Co and Ni that are currently being used in the commercial Li-ion cells. Mn also has far better power, is safer and is environmentally benign. However, the poor capacity retention (fading) of $LiMn_2O_4$ spinel has been a major drawback of this technology and has prevented its wide acceptance by manufacturers for commercialization. Moreover, the deterioration of its electrochemical performance, including capacity loss, impedance rise, and material instability, is far more severe at higher temperatures, above 40-50° C., that can easily be reached in portable electronic devices or hybrid electric vehicles. Although several factors have been reported to be responsible for the electrochemical degradation of the spinel based cells, it is generally attributed to the instability of manganese spinel. This degradation likely results from the formation and dissolution of manganese ions in the organic based electrolyte.

The dissolution of the manganese originates from the instability of the manganese (III) ions on the surface of the manganese spinel electrode during cycling in the $LiPF_6$ based organic electrolyte that is used in nearly all commercial Li-ion batteries today. The manganese (III) instability results from the disproportionation reaction that occurs on the surface of the spinel electrode ($2Mn^{3+}_{(stable\ solid)} \rightarrow Mn^{4+}_{(stable\ solid)} + Mn^{2+}_{(unstable\ solid,\ tending\ to\ be\ dissolved)}$). The $Mn^{2+}$ ions that are formed dissolve in the $LiPF_6$-containing organic electrolyte. Thereafter, the dissolved manganese ions diffuse through the electrolyte to the graphite anode where they are likely reduced to manganese metal and deposited on the anode surface. This phenomenon results in a huge increase in the impedance of the anode and a loss of active lithium from the cell, as well as the degradation of the spinel cathode. The result is a cell with poor electrochemical performance and little or no power.

In addition, manganese dissolution has been attributed to acid attack, and occurs even with trace levels of HF, commonly present in $LiPF_6$-based electrolytes. Together with the manganese ion diffusion problem as mentioned above, the presence of acid such as HF causes formation of a partially protonated $\lambda$-$MnO_2$ phase. This phase is not totally electrochemically active, since the protons are bonded to octahedral oxygen sites of the cubic close-packed oxygen array of $MnO_6$. This scenario suggests that with the manganese dissolution there is also the partial protonation of the $\lambda$-$MnO_2$ that leads to the deterioration of manganese spinel cathode material.

Since its introduction by Padhi et al. [A. K. Padhi, K. S. Nanjundaswamy, J. B. Goodenough, J. Electrochem. Soc., 144 (4), 1188 (1997)], $LiFePO_4$ olivine material has become one of the most studied cathodes for lithium-ion battery (LIB) applications. Unlike many cathodes, the electrochemistry of this material involves the $Fe^{2+}/Fe^{3+}$ redox couple, which occurs at a voltage of 3.45 V and has a theoretical capacity of 170 mAh/g. Discharged and charged positive active materials, $LiFePO_4$ and $FePO_4$, respectively, have the same structural arrangement, i.e. same space group and close crystalline parameters, leading to very good system stability during the electrochemical cycling process. This stability is not altered by $Fe^{3+}$ ion generation, in contrast to the highly oxidizing $Ni^{4+}$ ions that are involved in the charging of $LiM^{III}O_2$ (M=Ni, Co) layered material. In addition, the cutoff voltage of 3.45 V is low enough to prevent the acceleration of electrolyte aging but not so low as to sacrifice the energy density or electrochemical performance of the olivine. Moreover, $LiFePO_4$ is an inexpensive material, non toxic and environmentally benign. For these reasons, $LiFePO_4$ has been considered as a potentially attractive cathode material for LIB.

However, $LiFePO_4$ is an insulating material, which seriously limits its rate capability and thus its calendar life. Although extensive work has been conducted recently to enhance the electronic conductivity of the material, much room for improvement exists.

To prevent degradation of the cathode material, several approaches have been attempted, including cationic substitution of manganese or surface modification (coatings) of the spinel cathode or of graphite anode surfaces. See, e.g., C. Sigala, A. et al., J. Electrochem. Soc., 148, A826 (2001).; I. J. Davidson, et al., J. Power Sources, 54, 205 (1995); M. Yoshio, et al., J. Power Sources, 101, 79 (2001); and A. M. Kannan and A. Manthiram, Electrochem. Solid State Lett., 5, A167 (2002). While these methods have shown some promise at room temperature, none have prevented significant electrochemical deterioration due to the manganese dissolution at elevated temperatures. See, e.g., A. Blyr, et al., J. Electrochem. Soc., 145, 194 (1998); and G. G. Amatucci, et al., J. Electrochem. Soc., 148, A171 (2001). Accordingly, there is a need in the art to develop electrolyte systems that protect the cathode surface from any unwanted reactions. Furthermore, there is a need in the art for batteries using such electrolyte systems.

SUMMARY

In one aspect, the invention provides non-aqueous electrolyte solutions containing one or more electrode stabilizing additives for use in electrochemical devices. In another aspect, there are provided stabilized electrodes and battery cells incorporating the stabilized electrolytes. The batteries have excellent specific power and energy as well as extended calendar and cycle life across a broad temperature range with little or no power or capacity loss. In yet another aspect, there are provided methods of making the stabilized electrolytes of the invention. The non-aqueous electrolytes of the present invention, containing such stabilization additives, are effective in enhancing the performance of both spinel-based and olivine-based lithium ion batteries, as well as that of lithium cobalt oxide, lithium nickel-cobalt-oxide, and lithium vanadium oxide lithium ion cells and the like.

BRIEF DESCRIPTION OF DRAWINGS

FIG. 3A is after 1 cycle at 25° C.; and FIG. 3B is after 25 cycles at 55° C. The electrolyte used is 1.2 M $LiPF_6$ EC:PC:DMC (1:1:3).

DETAILED DESCRIPTION

Figure 1:
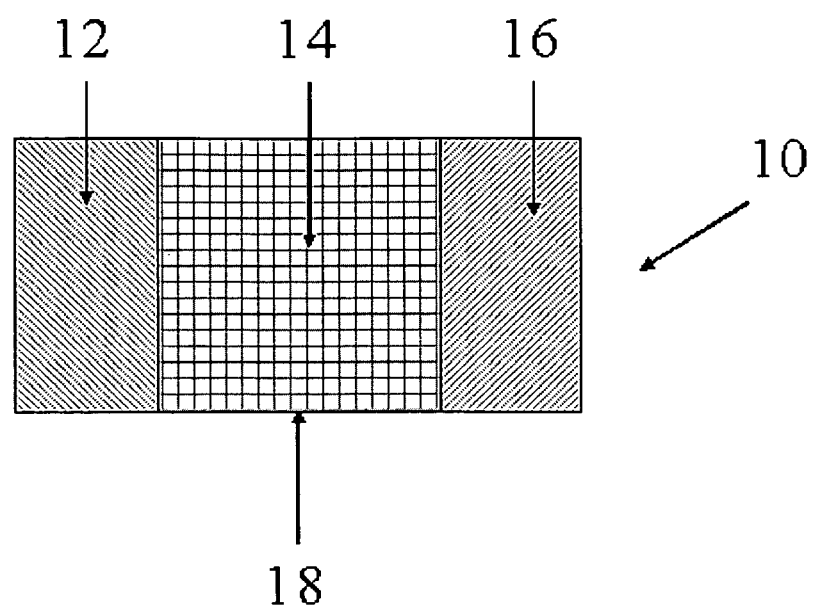
FIG. 1 depicts a schematic representation of an electrochemical cell as described in Example 1.

In accordance with one aspect of the present invention there are provided electrolytes that include an alkali metal salt such as a lithium(chelato)borate; a polar aprotic solvent; and an electrode stabilizing additive that is a substituted or unsubstituted linear, branched or cyclic hydrocarbon comprising at least one oxygen atom and at least one aryl, alkenyl, or alkynyl group. The electrolytes are substantially non-aqueous, i.e., the electrolytes contain either no water or almost no water (e.g., ≤100 ppm water). The electrode stabilizing additive can contain 1, 2, 3, 4, 5, or 6 or more oxygen atoms. In some embodiments, the electrode stabilizing additive has 1 or more alkenyl groups, and in others, 1 or 2 alkenyl groups.

As employed herein, substituted or unsubstituted linear, branched or cyclic hydrocarbons include linear or branched alkyl, alkenyl, and alkynyl groups, and cyclic groups such as cycloalkyl groups, saturated and unsaturated heterocyclyl groups, aryl groups, and heteroaryl groups. Cyclic groups of the invention include mono-, bi-, and polycyclic groups which may be fused or bridged, but are not spirocyclic. In some embodiments, the electrode stabilizing additive may be capable of forming a passivating film on the surface of an electrode, through thermal or electrochemical decomposition. In some embodiments, the electrode stabilizing additive comprises one or two substituted or unsubstituted aryloxy groups.

Exemplary electrode stabilizing additives include vinyl ethylene carbonate, divinyl ethylene carbonate, vinyl carbonate, divinyl carbonate, vinyl crotonate, aryloxycrotonate, 2,4-divinyl isooxazole, 3,5-divinyl furoate, 2,4-divinyl-1,3-dioxane, divinyl crotonate, divinylpyrazine, vinyl ethylene silicate, aryloxy-ethylene silicate, divinyl ethylene silicate, vinyl ethylene sulfate, aryloxy ethylene sulfate, divinyl ethylene sulfate, 2-vinyloxy-cyclopropanone, vinylethylene oxide, vinylcylopropanone, 3-vinyloxetane, 3-vinyltetrahydrofuran, 4-vinyltetrahydropyran, 3-vinylcyclobutanone, β-vinyl-γ-butyrolactone, dihydropyran-3-one, 2-amino-4-vinylcyclobutanone, 3-vinylaziridin-2-one, 3-vinyloxaziridine, 2-amino-3-vinylcyclopropanone, 2-amino-5-vinylcyclopentanone, 3-vinylazetidin-2-one, 3-vinylcyclopentanone, 5-vinylpiperidin-3-one, 2-amino-3-vinylcyclohexanone, 1-vinylazetidin-2-one, 3-(N-vinylamino)cyclohexanone, 2-vinyl-[1,2]oxazetidine, 3-vinylpyrrolidin-2-one, 1-vinylpyrrolidin-2-one, 1-vinylpiperidin-2-one, 2-vinylaminocyclopropanone, 1-vinylaziridin-2-one, oxiranylvinylamine, oxetan-2-yl-vinylamine, (tetrahydro-furan-2-yl)-vinylamine, 2-vinylaminocyclohexanol, 2-aryloxy-cyclopropanone, divinyl phenyl carbonate, aryloxy-phenyl carbonate, vinyl methacrylate, aryloxy-methacrylate, diphenyl divinyl silicate, divinyl furan, 4,4-divinyl-3-dioxolan-2-one, vinyl-2-furoate, aryloxy-2-furoate, divinyl propylene carbonate, divinyl butyl carbonate, divinyl ether, 1,3-butadiene carbonate, divinyl diphenyl ether, diaryloxy-diphenyl ether, vinyl ethylene sulfite, aryloxy-ethylene sulfite, divinyl ethylene sulfite, diaryloxy-ethylene sulfite, 4-allylanisole, divinyl methylphosphate, 1,2-divinyl furoate, allylglycidyl ether, butadiene monoxide, vinyl phosphate, aryloxy-phosphate, vinyl cyclopentanone, aryloxy cyclopentanone, vinyl methyl carbonate-allylanisole, methyl phosphate, ethyl phosphate, vinyl ethyl-2-furoate, aryloxy-ethyl-2-furoate, divinyl methoxypyrazine, aryloxy pyrazine, vinylmethoxy pyrrole, aryloxpyrrole, butyl vinyl ether, butyl-aryloxy-ether, divinyl methoxybipyridine, methoxy-o-terphenyl, aryloxy-o-terphenyl, 3,4-divinyl-1-methyl pyrrole, methoxy-4-vinylbiphenyl, 1-divinylimidazole, vinyl methoxy imidazole, aryloxyimidazole, methoxy carbazole, aryloxy-carbazole, vinyl methoxy carbazole, aryloxy-carbazole trivinylphosphate, vinyl-tetrahydrofuran, aryloxy-tetrahydrofuran, 2-vinyloxetane, aryloxyoxetane, divinyl methoxy furan, diaryloxy-furan, vinyl pyridazine, aryloxy-pyridazine, vinyl methoxyquinoline, aryloxy-quinoline, vinyl methoxy piperidine, aryloxy-piperidine, vinyl methoxypyrazine, (vinyl)(methoxy)(tetrafluoro)cyclotriphosphazene, (aryloxy)(tetrafluoro)(methoxy)cyclotriphosphazene, (divinyl)(methoxy)(trifluoro)cyclotriphosphazene, (diaryloxy)(trifluoro)(methoxy)cyclotriphosphazene, (trivinyl)(difluoro)(methoxy)cyclotriphosphazene, diphenyl ether, diphenyl silicate, diphenyl carbonate, 2,4-dimethyl-6-hydroxy-pyrimidine, or a mixture of any two or more thereof. In some embodiments the electrode stabilizing addivtive may be a cyclotriphosphazene that is substituted with F, alkyloxy, alkenyloxy, aryloxy, methoxy, allyloxy groups, or combinations thereof. In some embodiments, the electrode stabilizing additive is vinyl ethylene carbonate, vinyl carbonate, or 1,2-diphenyl ether, or a mixture of any two or more thereof.

Stabilizing additives of the invention are present in a wide range of amounts in the non-aqueous electrolyte. For example, the stabilizing additive can be present at from about 0.0005 to about 15, 30 or even 50 weight percent (wt %) of the electrolyte. Alternatively, the additive can be present at from about 0.0005, 0.001, 0.01, or 0.1 wt % to about 2, 5, or 10 wt %. Typically the additive is present at from about 0.01 wt % to about 2 wt %.

Inventive electrolytes include an alkali metal salt dissolved in a polar aprotic solvent. The alkali metal salt is a conducting salt and is typically present at a concentration of from about 0.5 to about 2 molar. Lithium salts are particularly useful in electrolytes of the invention. Exemplary lithium salts include $Li[(C_2O_4)_2B]$, $Li(C_2O_4)BF_2$, $LiPF_2(C_2O_4)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof. Lithium (chelato)borates such as $Li[(C_2O_4)_2B]$ and $Li(C_2O_4)BF_2$, and lithium (chelato)phosphates such as $LiPF_2(C_2O_4)_2$, can also be used as the alkali metal salt. Generally, blends of two or more alkali metal salts may be employed; see for example, pending U.S. application Ser. No. 10/857,365, herein incorporated by reference in its entirety.

Suitable polar aprotic solvents include, for example, ethyl acetate, propyl acetate, ethylene carbonate, propylene carbonate, dimethyl carbonate, diethyl carbonate, ethyl methyl carbonate, diethyl ether, methyl acetate, gamma-butyrolactone, sulfolane, or a mixture of any two or more thereof. Protic solvents such as water and alcohols cannot be used with the present invention. In some embodiments, the polar aprotic solvent does not have an aryl, vinyl, or alkynyl group.

In another aspect, there are provided electrolytes that include an alkali metal salt; a polar aprotic solvent; and an electrode stabilizing additive, capable of undergoing thermal or electrochemical decomposition to form a passivating film on an electrode, that is a substituted aryl compound or a substituted or unsubstituted heteroaryl compound wherein the additive comprises at least one oxygen atom. The electrolyte is substantially non-aqueous as described above and includes any of the alkali metal salts and polar aprotic solvents described herein. The electrode stabilizing additive can be, for example, a phenyl, naphthyl, or anthracenyl compound, or a pyrrolyl, oxazolyl, furanyl, indolyl, carbazolyl, imidazolyl, or thiophenyl compound. For example, the electrode stabilizing additive can be diaryloxy-propylene carbonate, aryloxy-pyrrole, aryloxy-crotonate, diaryloxy-crotonate, aryloxy-ethylene silicate, diaryloxy-ethylene silicate, aryloxy-ethylene sulfate, diaryloxy-ethylene sulfate, aryloxy-cyclopropanone, 2-aryl-cyclopropanone, divinyl phenyl carbonate, diaryloxy-phenyl carbonate, aryloxy-methacrylate, diphenyl divinyl silicate, diphenyl diaryloxy silicate, diaryloxy furan, aryloxy-2-furoate, diaryloxy ethylene carbonate, diaryloxy-propylene carbonate, diaryloxy-butyl carbonate, divinyl methoxydiphenyl ether, diaryloxy-diphenyl ether, aryloxy-ethylene sulfite, diaryloxyethylene sulfite, 4-allylanisole, aryloxy-phosphate, aryloxy-cyclopentanone, diaryloxy-cyclotriphosphazene, aryloxy-cycolophosphazene, 1,2-divinyl furoate, 2-diaryloxy-furoate, vinyl methoxyquinoline, aryloxy-quinoline, divinyl methyl phosphate, diaryloxy methyl phosphate, aryloxy-cyclobutane, vinyl methoxy imidazole, aryloxy-imidazole, methoxycarbazole, aryloxy-carbazole, diaryloxy-ethyl silicate, diphenyl ether, diphenyl silicate, diphenyl carbonate, or 2,4-dimethyl-6-hydroxy-pyrimidine, or a mixture of any two or more thereof. In some embodiments the electrode stabilizing additive and the polar aprotic solvent are not the same.

In yet another embodiment, there are provided electrolyte blends which include a lithium metal salt other than a lithium (chelato)borate or a lithium (chelato)phosphate (i.e., other than $Li[(C_2O_4)_2B]$, $Li(C_2O_4)BF_2$, and $LiPF_2(C_2O_4)_2$); a polar aprotic solvent; and a first electrode stabilizing additive that is a lithium (chelato)borate additive, such as $Li[(C_2O_4)_2B]$ or $Li(C_2O_4)BF_2$, or a lithium (chelato)phosphate additive, such as $LiPF_2(C_2O_4)_2$. The electrolyte is substantially non-aqueous as above. In some embodiments, a second electrode stabilizing additive may be included in the electrolyte such as described herein and/or may include a substituted or unsubstituted organoamine, alkane, alkene, or aryl compound or mixtures of any two or more thereof as described in copending U.S. patent application Ser. No. 10/857,365. In some embodiments the second electrode stabilizing additive may be a substituted or unsubstituted linear, branched or cyclic hydrocarbon, other than a spirocyclic hydrocarbon, comprising at least one oxygen atom and at least one aryl, alkenyl or alkynyl group. Representative second electrode stabilizing additives thus include vinyl biphenyl, vinyl naphthalene, vinyl anthracene, vinyl pyridine, or a mixture of any two or more thereof. The lithium metal salt and polar aprotic solvent of the present embodiments are also as described herein.

In the electrolyte blends of the present invention, the first and second electrode stabilizing additives are present independently in an amount from about 0.0005 to about 10, 20, 30 or even 50 wt %. Typically, the first additive is present in an amount of about 0.01 to about 10 wt %, and more typically, from about 0.01 to about 2 wt %. The second additive is typically present in an amount of about 0.0005 to about 2, 4, 6, 8, or 10 wt %, and in some embodiments, about 0.001 to about 2 wt %.

There are further provided methods of making the non-aqueous electrolytes of the present invention. In some embodiments, the method includes combining an alkali metal salt such as a lithium(chelato)borate or lithium (chelato)phosphate; a polar aprotic solvent; and an electrode stabilizing additive as described herein, including but not limited to a substituted or unsubstituted linear, branched or cyclic hydrocarbon comprising at least one oxygen atom and at least one aryl, alkenyl, or alkynyl group. In some embodiments of the method, the electrode stabilizing additive is a substituted aryl compound or a substituted or unsubstituted heteroaryl compound in which the additive includes at least one oxygen atom. In other embodiments, the alkali metal salt is a lithium salt which is other than a lithium(chelato)borate or a lithium (chelato)phosphate (i.e. Li[$(C_2O_4)_2$B], Li$(C_2O_4)$BF$_2$, and LiPF$_2$$(C_2O_4)_2$), and the electrode stabilizing additive may include a first electrode stabilizing additive such as a lithium (chelato)borate or a lithium (chelato)phosphate. A second electrode stabilizing additive may be combined with the electrolyte including, e.g., a substituted or unsubstituted linear, branched or cyclic hydrocarbon comprising at least one oxygen atom and at least one aryl, alkenyl, or alkynyl group and/or a substituted or unsubstituted organoamine, alkane, alkene, or aryl compound. The present methods can employ any of the alkali metal salts or polar aprotic solvents described herein.

While not wishing to be limited by any theory, it is believed that electrochemical devices of the present invention exhibit enhanced performance due to the electrode stabilizing additives present in the non-aqueous electrolytes. Thus, it is believed that the additives protect the electrodes from chemical attack, thereby lessening or preventing subsequent performance degradation. Specifically, it is believed that during initial formation of the electrochemical device, the additive undergoes thermal or electrochemical decomposition to form a protective film on the surface of the positive electrode (cathode), and/or the additive may form a protective film on the surface of the negative electrode (anode). By decomposition it is meant that the additive polymerizes, oxidizes, degrades, isomerizes, oligomerizes, or otherwise forms a passivating film upon either the cathode or anode. The passivating film prevents Mn$^{2+}$ and Fe$^{2+}$ ions from dissolving in the electrolyte and stabilizes the cell in general. The passivating film should prevent ions on the order of the size of Mn$^{+2}$ and Fe$^{+2}$ from passing through the film in either direction. Where a passivating film is formed on the anode, the film also lessens or prevents the reduction of Mn$^{2+}$ ions (from spinel cathodes) and Fe$^{2+}$ ions (from olivine cathodes) at the anode surface. During the film-forming process, inventive additives may be oxidized, or oxidized and polymerized. Additives of the invention typically have an oxidation potential ranging from about 1.5V to about 6.5V. In some embodiments the oxidation potential of the additive is from about 2.8V to about 5.5V. In some embodiments, the reduction potential of the additive is from about 0.8V to 2.8 V Thus, in accordance with another aspect, the invention provides an electrode for an electrochemical device comprising a surface and a passivating film formed on the surface from an electrode stabilizing additive that decomposes to form the passivating film. The passivating film may be formed from any additive described herein. Thus, for example, a substituted or unsubstituted linear, branched or cyclic hydrocarbon comprising at least one oxygen atom and at least one aryl, alkenyl or alkynyl group may be used to passivate inventive electrodes. The passivating film may also be formed from additives such as a substituted aryl compound or a substituted or unsubstituted heteroaryl compound wherein the additive comprises at least one oxygen atom. Exemplary additives are described herein. Alternatively, a combination of two additives can be used. In some such embodiments, one additive is selective for forming a passivating film on the cathode to prevent leaching of metal ions and the other additive can be selective for passivating the anode surface to prevent or lessen the reduction of metal ions at the anode. For example, a combination of 2,4-divinyl-tetrahydropyran and 2,5-divinyl-[1,3]dioxane; 2,5-divinyl-tetrahydropyran and 2,5-divinyl-[1,3]dioxane; 3,4-divinyl-1-methyl pyrrole and 4,5-divinyl isoxazole; or 2,4-divinyl-1,3-dioxane and divinyl propylene carbonate can be used as the electrode stabilizing additive.

In another aspect, the invention provides a method for forming a passivating film on a cathode comprising charging an electrochemical device, wherein the electrochemical device comprises: an anode; a cathode; and a substantially non-aqueous electrolyte comprising an alkali metal salt; a polar aprotic solvent; and an electrode stabilizing additive, capable of forming a passivating film on the surface of an electrode; wherein the electrode stabilizing additive is a substituted or unsubstituted linear, branched or cyclic hydrocarbon, other than a spirocyclic hydrocarbon, comprising at least one oxygen atom and at least one aryl, alkenyl or alkynyl group. The charging step may be followed by a discharging step. In some embodiments, the charging and discharging steps may be repeated two or more times.

In another aspect, the invention provides a method for forming a passivating film on a cathode comprising charging an electrochemical device, wherein the electrochemical device comprises: an anode; a cathode; and a substantially non-aqueous electrolyte comprising an alkali metal salt; a polar aprotic solvent; and an electrode stabilizing additive, capable of forming a passivating film on the surface of an electrode; wherein the electrode stabilizing additive is a substituted aryl compound or a substituted or unsubstituted heteroaryl compound comprising at least one oxygen atom. The charging step may be followed by a discharging step. In some embodiments, the charging and discharging steps may be repeated two or more times.

In another aspect, the invention provides an electrochemical device comprising: a cathode; an anode; and an electrolyte as described herein. In one embodiment, the electrochemical device is a lithium secondary battery; the cathode is a lithium metal oxide cathode; the anode is a carbon or lithium metal anode; and the anode and cathode are separated from each other by a porous separator; wherein the electrode stabilizing additive undergoes thermal or electrochemical decomposition to form a passivating film on the surface of the cathode or anode. Typically, the cathode in such a cell includes spinel, olivine, carbon-coated olivine, C-LiFePO$_4$, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, LiMet$_{0.5}$Mn$_{1.5}$O$_4$, Li$_{1+x}$Ni$_\alpha$Mn$_\beta$Co$_\gamma$Met'$_\delta$O$_{2-z}$F$_z$, A$_n$B$_2$(XO$_4$)$_3$ (Nasicon), vanadium oxide, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, and Zn; B is Ti, V, Cr, Fe, and Zr; X is P, S, Si, W, Mo; 0≤x≤0.3, 0≤y≤0.5, 0≤z≤0.5; 0≤x'≤0.4, 0≤α≤1, 0≤β≤1, 0≤γ≤1, 0≤δ≤0.4, and 0≤z'≤0.4; and 0≤n'≤3. In such devices the anode may comprise graphite, amorphous carbon, Li$_4$Ti$_5$O$_{12}$, tin alloys, silicon alloys, intermetallic compounds, lithium metal, or mixtures of any two or more thereof. Suitable graphitic materials including natural graphite, artificial graphite, graphitized meso-carbon microbeads, and graphite fibers, as well as any amorphous carbon materials.

In the electrochemical cells of the present invention, the cathode can include spinel, olivine, or carbon-coated olivine (see Published U.S. Patent Application No. 2004/0157126). For example, the spinel can be a spinel manganese oxide with the formula of Li$_{1+x}$Mn$_{2-z}$Met$_y$O$_{4-m}$X$_n$, wherein Met is Al, Mg, Ti, B, Ga, Si, Ni, or Co; X is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. Alternatively, the cathode can comprise olivine with a formula of $Li_{1+x}Fe_{1-z}Met''_yPO_{4-m}X_n$, wherein Met'' is Al, Mg, Ti, B, Ga, Si, Ni, Mn or Co; X is S or F; and wherein $0 \leq x \leq 0.3$; $0 \leq y \leq 0.5$, $0 \leq z \leq 0.5$, $0 \leq m \leq 0.5$ and $0 \leq n \leq 0.5$.

Cathodes of the present invention may be further stabilized by surface coating the particles of the spinel or olivine with a material that can neutralize acid or otherwise lessen or prevent leaching of the manganese or iron ions. Hence the cathodes can also comprise a surface coating of a metal oxide on the spinel or olivine particles such as $ZrO_2$, $TiO_2$, $ZnO$, $WO_3$, $Al_2O_3$, $MgO$, $SiO_2$, $SnO_2$ $AlPO_4$, $Al(OH)_3$, a mixture of any two or more thereof, or any other suitable metal oxide. The coating can also be applied to a carbon-coated olivine. Where carbon-coated olivine is used, the metal oxide coating can be applied to the carbon-coated olivine or can be applied to the olivine first followed by carbon coating of the metal oxide film. Methods for coating spinel cathodes with metal oxides are disclosed below and may be adapted for use with olivine cathodes.

The metal oxide coating on spinel can be applied using a variety of processes. For example, the coating element source can be dissolved in an organic solvent or water. The coating element sources include metal alkoxide, salt or oxide (e.g., aluminum isopropoxide or magnesium methoxide). Spinel cathode materials are then dispersed in the coating solution. The mixture is stirred until the organic solvent is completely evaporated. If necessary, a flushing gas ($CO_2$ or moisture-free inert gas) may be used to help facilitate evaporation of the solvent in the coating solution. The dried, coated material is then heat-treated at a temperature ranging from about 100° C. to about 500° C.

A $TiO_2$ coating can be applied to spinel powders by hydroxylation of tetra-n-butyl titanate (TBT). Thus, for example, the titanate can be reacted with LiOH to precipitate the titanium hydroxide onto the spinel powder. The coated material can be heat-treated at from about 100° C. to about 400° C. to yield spinel particles with the desired oxide coating.

A sol-gel process may also be employed in the coating of the spinel. The coating materials including M-ethylhexanate-diisopropoxide (M=Zr, Al, Ti, B, Si) and tin ethylhexanoisopropoxide can be dissolved in alcohol (e.g., 2-propanol or isopropanol). The cathode materials are then mixed with the coating solution and annealed at from about 100° C. to about 500° C. Alternatively, a coating solution can be prepared by dissolving ethyl silicate in ethanol and water. Spinel powder is immersed in the coating solution, stirred, dried at 110° C., and then is calcined at from about 200° C. to about 500° C.

The process of coating spinel with $AlPO_4$ can be carried out by dissolving aluminum nitrate and ammonium phosphate in water until a light white suspension solution (the $AlPO_4$ nanoparticle solution) is observed. Spinel cathode powder is then added to the coating solution and mixed. The slurry can be dried and annealed at from about 100° C. to about 500° C.

Colloidal suspensions may also be used to coat spinel with metal oxides. For example, the spinel powders can be coated using a 4 wt % (~0.3 mol %) colloidal $ZrO_2$ suspension. The spinel particles are immersed and stirred in the $ZrO_2$ suspension for about 1 h, followed by evaporation of the nascent liquid at 75° C. Thereafter, the products can be heated at from about 200° C. to about 400° C. or about 500° C.

Alternatively, the $ZrO_2$ coating of spinel can be carried out by using two different coating solutions (zirconium oxide+ polymeric precursor or an aqueous solution of zirconium nitrate). Spinel may be mixed with the coating solutions until the mixture is dry. Then the mixture may be heated at 100° C. to evaporate the solvents in the coating solutions. The dried mixture may be heat-treated at 200-500° C.

A $ZnO_2$ coating may be applied to the spinel by dissolving zinc acetate in water, followed by adding the spinel powder, and thoroughly mixing for about 4 h at room temperature. After drying, the coated powder is heated at 120° C., and is further calcined at from about 200° C. to about 400° C.

Finally, spinel can be coated using a co-precipitation process. Spinel powder is dispersed into a $NaHCO_3$ solution and ultrasonically agitated. The suspension is then stirred mechanically while $Al_2(SO_4)_3$ solution is added drop wise to it. In this way, $Al(OH)_3$ is precipitated onto the spinel particle surface. The final powder is filtered, washed, and dried. The dried powder is heated in air at from about 200° C. to about 600° C.

Stabilized electrodes comprised of blends of materials and electrochemical devices employing the same are also within the scope of the present invention. For example, the cathode may include a blend of spinel and $Li_{1+x}Ni_\alpha Mn_\beta Co_\gamma Met'_\delta O_{2-z}F_z$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. The ratio of spinel to $Li_{1+x}Ni_\alpha Mn_\beta Co_\gamma Met'_\delta O_{2-z}F_z$, is typically from about 0.5 to about 60 wt %. Suitable cathodes can also include a blend of olivine or carbon-coated olivine and $Li_{1+x}Ni_\alpha Mn_\beta Co_\gamma Met'_\delta O_{2-z}F_z$, wherein Met' is Mg, Zn, Al, Ga, B, Zr, or Ti; and wherein $0 \leq x \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. As before, the ratio of olivine or carbon-coated olivine to $Li_{1+x}Ni_\alpha Mn_\beta Co_\gamma Met'_\delta O_{2-z}F_z$, maybe from about 0.5 to about 98 wt %.

Such mixed electrodes can be used with any of the electrochemical devices described herein, including those in which the alkali metal salt of the electrolyte is $Li(C_2O_4)BF_2$, $Li[(C_2O_4)_2B]$, $LiPF_2(C_2O_4)_2$, or mixtures thereof as well as those utilizing the electrode stabilizing additives described herein.

The porous separator may be made from materials well known to those skilled in the art. Typically, the porous separator comprises polypropylene, polyethylene, or a multilayer laminate of polypropylene and polyethylene.

The following terms are used throughout as defined below.

Spirocyclic hydrocarbons include ring systems comprising carbon and hydrogen and having two or more rings in which at least two of the rings are joined at a single saturated carbon. Thus, fused and bridged hydrocarbons in which two rings are joined at 2 or more carbons are not spirocyclic hydrocarbons.

The term "spinel" refers to manganese-based spinel such as, e.g., $Li_{1+x}Mn_{2-z}Met_yO_{4-m}X_n$, wherein Met is Al, Mg, Ti, B, Ga, Si, Ni, or Co; X is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

The term "olivine" refers to iron-based olivine such as, e.g., $Li_{1+x}Fe_{1-z}Met''_yPO_{4-m}X_n$, wherein Met'' is Al, Mg, Ti, B, Ga, Si, Ni, Mn or Co; X is S or F; and wherein $0 \leq x \leq 0.3$; $0 \leq y \leq 0.5$, $0 \leq z \leq 0.5$, $0 \leq m \leq 0.5$ and $0 \leq n \leq 0.5$.

Alkyl groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neo-pentyl, and isopentyl groups. Representative substituted alkyl groups may be substituted one or more times with, for example, amino, thio, hydroxy, cyano, alkoxy, and/or halo groups such as F, Cl, Br, and I groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to, 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e. alkenyl groups with two points of attachment, may include but are not limited to CH—CH=$CH_2$, C=$CH_2$, or C=$CHCH_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to CH—C=CH.

Aryl groups are cyclic aromatic hydrocarbons that do not contain heteroatoms. Thus, aryl groups include, but are not limited to, phenyl, azulenyl, heptalenyl, biphenylenyl, indacenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like) and fused aromatic-unsaturated ring systems (e.g., indenyl, fluorenyl, and the like). It does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to, 2-; 3-; 4-; 5-; or 6-substituted phenyl or naphthyl groups, which may be substituted with groups including, but not limited to, amino, nitro, carboxy, carboxamido, hydroxy, thio, alkoxy, alkyl, cyano, and/or halo.

Heterocyclyl groups include aromatic and non-aromatic ring compounds containing 3 or more ring members, of which, one or more is a heteroatom such as, but not limited to, N, O, and S. In some embodiments, heterocyclyl groups include 3 to 20 ring members, whereas other such groups have 3 to 15 ring members. The phrase "heterocyclyl group" includes mono-, bi-, and polycyclic ring systems. Heterocyclyl groups thus include fused ring species including those comprising fused aromatic and non-aromatic groups. However, the phrase does not include heterocyclyl groups that have other groups, such as alkyl or halo groups, bonded to one of the ring members. Rather, these are referred to as "substituted heterocyclyl groups". Heterocyclyl groups include, but are not limited to, pyrrolidinyl, piperidinyl, piperazinyl, morpholinyl, pyrrolyl, pyrazolyl, triazolyl, imidazolyl, imidazolidinyl, tetrazolyl, oxazolyl, oxazolinyl, oxazolidinyl, isoxazolyl, isoxazolinyl, isoxazolidinyl, thiazolyl, pyridinyl, pyridazinyl, pyrazinyl, pyrimidinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups may be mono-substituted or substituted more than once, such as, but not limited to, pyridazinyl, pyridinyl, oxazolidinyl, oxazolinyl, or oxazolyl groups, which are 2-, 3-, 4-, 5-, or 6-substituted, or disubstituted with groups including, but not limited to, amino, hydroxyl, thio, alkoxy, alkyl, cyano, and/or halo.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, imidazolyl, triazolyl, tetrazolyl, oxazolyl, oxazolinyl, oxazolidinyl, isoxazolyl, isoxazolinyl, isoxazolidinyl, thiazolyl, pyridinyl, pyridazinyl, pyrazinyl, pyrinidinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Although the phrase "heteroaryl groups" includes fused ring compounds such as indolyl and 2,3-dihydro indolyl, the phrase does not include heteroaryl groups that have other groups bonded to one of the ring members, such as alkyl groups. Rather, heteroaryl groups with such substitution are referred to as "substituted heteroaryl groups". Representative substituted heteroaryl groups may be substituted one or more times with groups including, but not limited to, amino, alkoxy, alkyl, thio, hydroxy, cyano, and/or halo.

In general, "substituted" refers to a group as defined above in which one or more bonds to a hydrogen atom contained therein are replaced by a bond to non-hydrogen atoms such as, but not limited to, a halogen atom such as F, Cl, Br, and I; an oxygen atom in groups such as hydroxyl groups, alkoxy groups, aryloxy groups, aralkoxy groups, and ester groups; a sulfur atom in groups such as thiol groups, alkyl and aryl sulfide groups, sulfone groups, sulfonyl groups, sulfonamide, and sulfoxide groups; a nitrogen atom in groups such as nitro groups, amines, amides, alkylamines, dialkylamines, arylamines, alkylarylamines, diarylamines, N-oxides, imides, ureas, guanidines, amidines and enamines; a silicon atom in groups such as in trialkylsilyl groups, dialkylarylsilyl groups, alkyldiarylsilyl groups, and triarylsilyl groups; and other heteroatoms in various other groups. Substituted alkyl groups and also substituted cycloalkyl groups and others also include groups in which one or more bonds to a carbon(s) or hydrogen(s) atom is replaced by a bond to a heteroatom such as oxygen in carbonyl, carboxyl, and ester groups; nitrogen in groups such as imines, oximes, hydrazones, and nitriles.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Figure 2:
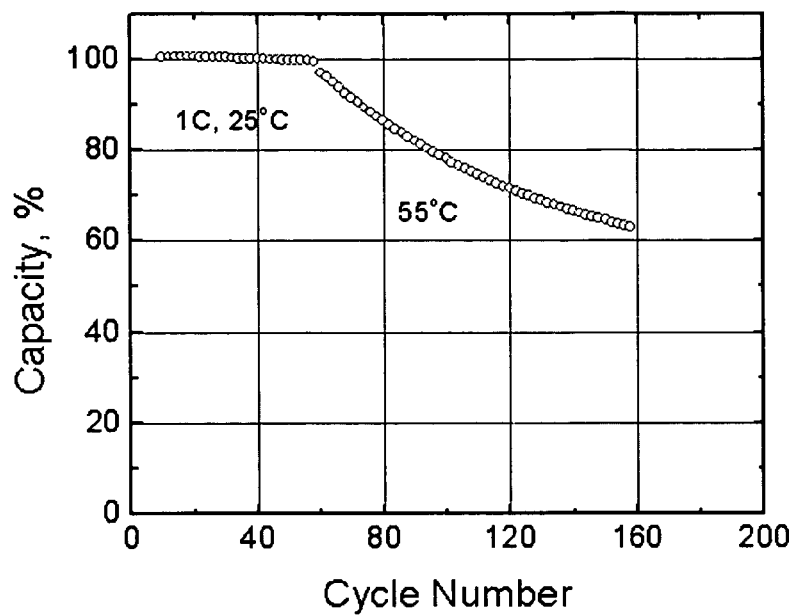
FIG. 2 is a schematic illustration of the specific capacity retention of $LiMn_2O_4$ spinel cathode versus carbon anode in 1.2 M $LiPF_6$ in 3:7 mixture of ethylene carbonate (EC)/ethyl methyl carbonate (EMC) electrolyte at 55° C.

The specific examples referred to here utilizes an electrochemical cell, such as that depicted in FIG. 1. Referring to FIG. 1, there is disclosed an electrochemical cell 10 having an anode 12 separated by an electrolyte/separator 14 and a cathode 16, all contained in an insulating housing 18 with the anode separated from the cathode by the electrolyte and suitable terminals (not shown) being provided in electrical contact respectively with the anode 12 and the cathode 16. Binders associated with the respective electrodes are well known in the art and will not be described here (e.g., polyvinylidene difluoride). In this particular example, the electrochemical cell comprises a graphite anode such as natural graphite, artificial graphite meso-carbon microbead, carbon fiber or hard carbon, a manganese spinel cathode, and an electrolyte of approximately 1.2 M $LiPF_6$ in EC:EMC (3:7 by wt %). FIG. 2 depicts the resulting capacity retention when the cell was cycled between 3.0 and 4.1 V. It shows a drastic capacity decrease with cycling at 55° C.

Example 2

Figure 3:
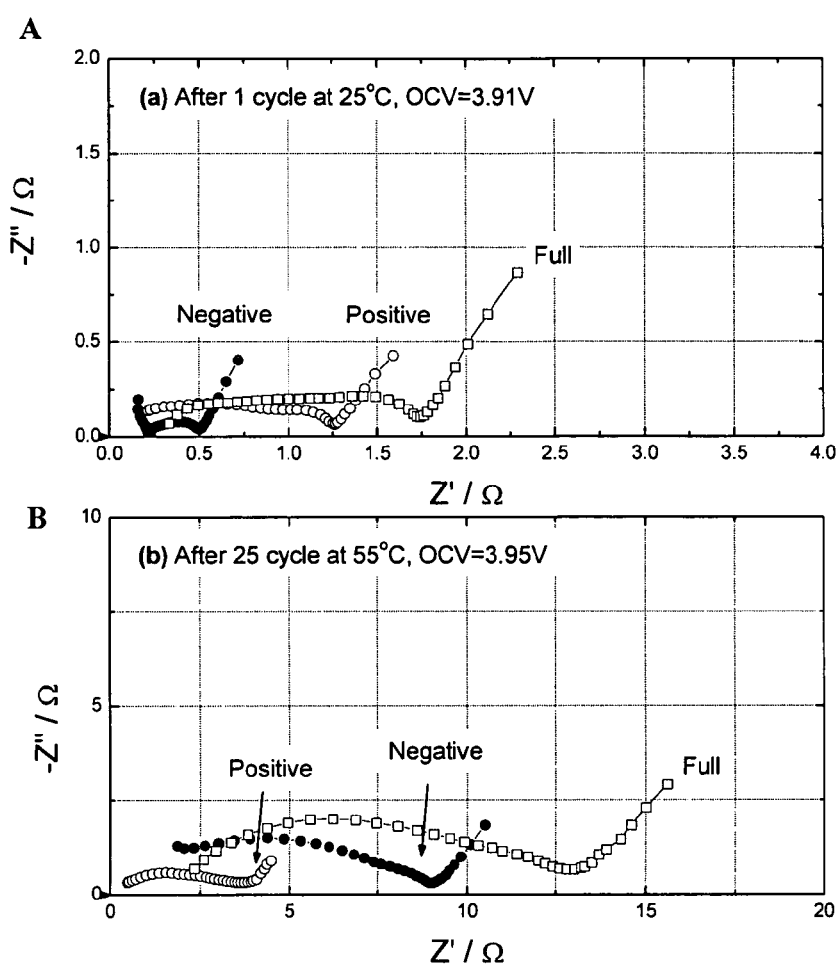
FIG. 3 shows impedance data for the anode and cathode components of the graphite/$Li_{1.06}Mn_{1.94-x}Al_xO_4$ cell with Li—Sn alloy reference electrode (RE)
Figure 4:
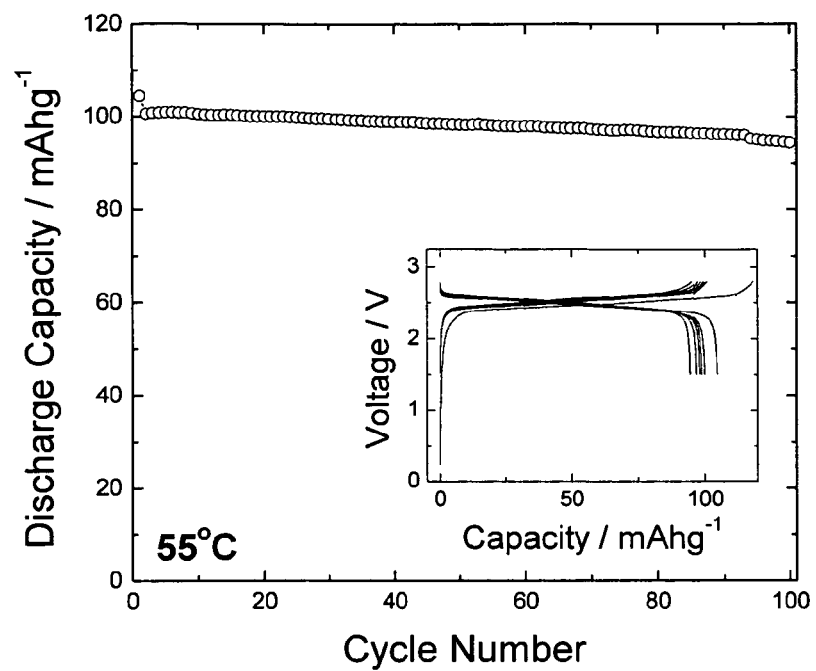
FIG. 4 illustrates variations of the cell capacity vs. cycle number of $Li_4Ti_5O_{12}$/substituted spinel cell cycled in the voltage range of 2.8-1.5 V. The charge/discharge curves are shown in the inset. The electrolyte used is 1.2 M $LiPF_6$ EC:PC:DMC (1:1:3).

To investigate the origin of the significant degradation of the graphite/substituted spinel cells in spite of the suppressed $Mn^{2+}$ ion dissolution, the AC impedance of the cell was measured during cycling at 55° C. using a specially designed Li—-Sn reference electrode. The results are shown in FIG. 3. The AC impedance was measured after one formation cycle at room temperature (FIG. 3A) and after 25 cycles at 55° C. (FIG. 3B). At the initial stages of cycling, the impedance of the negative electrode was much smaller than that of the positive electrode; however, after 25 cycles at 55° C., the impedance of negative electrode increased significantly and overwhelmed that of the positive electrode.

The graphite anode cycled in the Li-ion cell based on manganese spinel at 55° C. was examined by energy dispersive spectroscopy (EDS). The EDS spectrum clearly showed the presence of Mn metal on the graphite surface. It is thought that the dissolved $Mn^{2+}$ was reduced at the graphite surface, whose potential is ca. 0.08V vs. $Li^0$, and played a catalytic role in forming a film at the graphite surface leading to the huge rise of interfacial impedance at the negative electrode.

Figure 6:
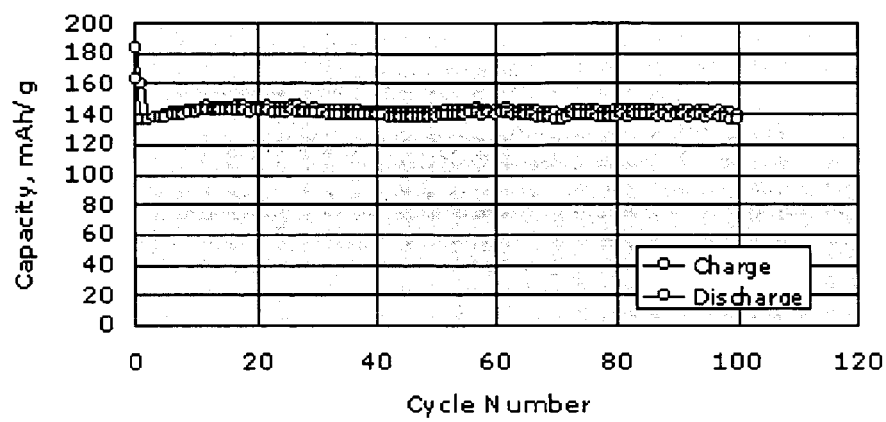
FIG. 6 is a graph of charge and discharge capacity vs. Cycle number of C-$LiFePO_4$/Lithium cell at C/3 and 25° C. The electrolyte used is 1.2 M $LiPF_6$ in EC:PC:DMC (1:1:3).

To prove this hypothesis, a cycling experiment was performed, using a $Li_4Ti_5O_{12}$ spinel anode, whose nominal voltage is ca. 1.5V vs. $Li^0$. FIG. 6 shows the cycling performance of the $Li_4Ti_5O_{12}/Li_{1.06}Mn_{1.94-x}Al_xO_4$ cell at 55° C. The result is that the $Li_4Ti_5O_{12}/Li_{1.06}Mn_{1.94-x}Al_xO_4$ cell exhibited excellent capacity retention (95% after 100 cycles) compared with the graphite/$Li_{1.06}Mn_{1.94-x}Al_xO_4$ cell, which we attribute to the fact that the $Mn^{2+}$ remains in the electrolyte solution and is not reduced on the $Li_4Ti_5O_{12}$ surface, due to its high reduction potential, wherein $0.01 \leq x \leq 0.05$.

Example 3

Figure 5:
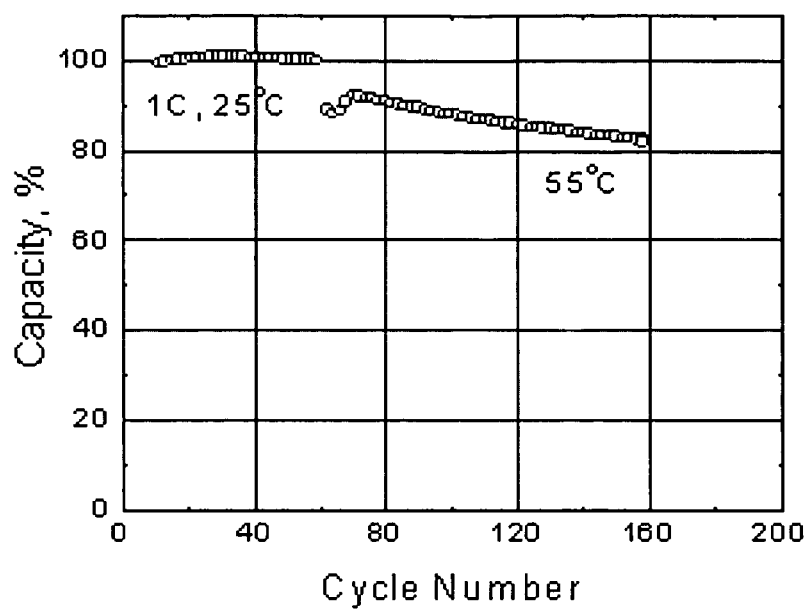
FIG. 5 is a schematic illustration of the specific capacity retention of $LiMn_2O_4$ cathode versus carbon anode in 1M $Li(C_2O_4)BF_2$ in EC/propylene carbonate (PC)/dimethyl carbonate (DMC) (1:1:3) electrolyte at 55° C.

1.0 M $Li(C_2O_4)BF_2$ in EC/PC/DMC (1/1/3) electrolyte was used in spinel/carbon cell system (carbon anode is GDR) instead of 1.2 M $LiPF_6$ in EC/EMC (3/7). The results of cycling the cell between 3.0 and 4.1 V are shown in FIG. 5. This cell system demonstrated an improved capacity retention over the electrochemical cell of Example 1. The improved performance of $Li(C_2O_4)BF_2$ is attributed to its greater stability compared to $LiPF_6$, i.e., $Li(C_2O_4)BF_2$ does not generate a strong acid that leaches the $Mn^{2+}$ ion from the spinel.

Example 4

$LiFePO_4$ was prepared by a solid-state reaction of a 1:1:1 (molar ratio) mixture of iron(II) oxalate, ammonium dihydrogen phosphate and lithium carbonate. The precursors were mixed by ball milling in acetone overnight. The resulting gel was dried at 60° C. under vacuum, thoroughly reground, and finally heated under purified $N_2$ gas for 24 h at 700° C. The resulting gray powder was coated with carbon layers using a preheated flow of $N_2/C_3H_6$ in a gas phase process. The technique, called Carbon Coating Technology (CCT), consists of feeding a pre-heated reactor furnace containing olivine material with a mixture of $N_2$ an inert gas and propylene $C_3H_6$ as the carbon source gas. [See published U.S. Patent Application No. US20040157126.] The temperature at which the cracking of $C_3H_6$ was achieved was fixed at 700° C. The electrochemical study was carried out on both the $LiFePO_4$ and the carbon coated $LiFePO_4$.

Figure 7:
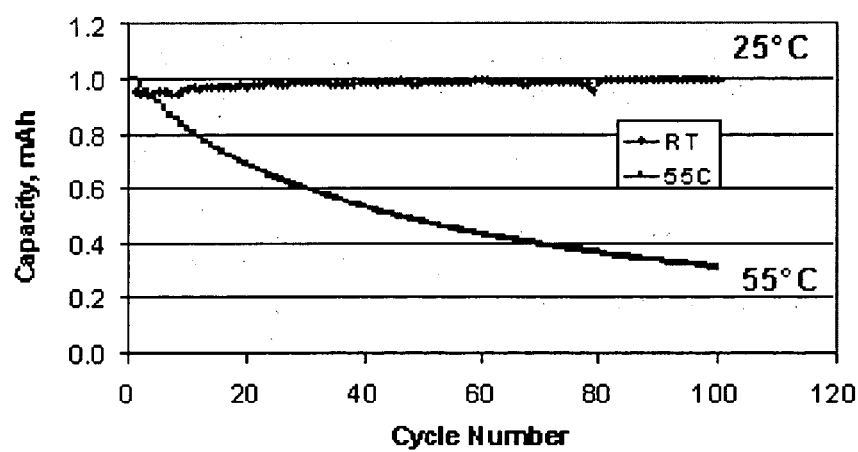
FIG. 7 compares the discharge capacity vs. cycle number of C-$LiFePO_4$/Graphite at 25° C. and 55° C. with 1.2 M $LiPF_6$ in EC:PC:DMC (1:1:3) electrolyte. At 25° C., the cell cycled well with limited capacity loss. However, the cell cycled at 55° C. exhibits significant capacity loss: over 85% capacity fade after only 100 cycles.
Figure 8:
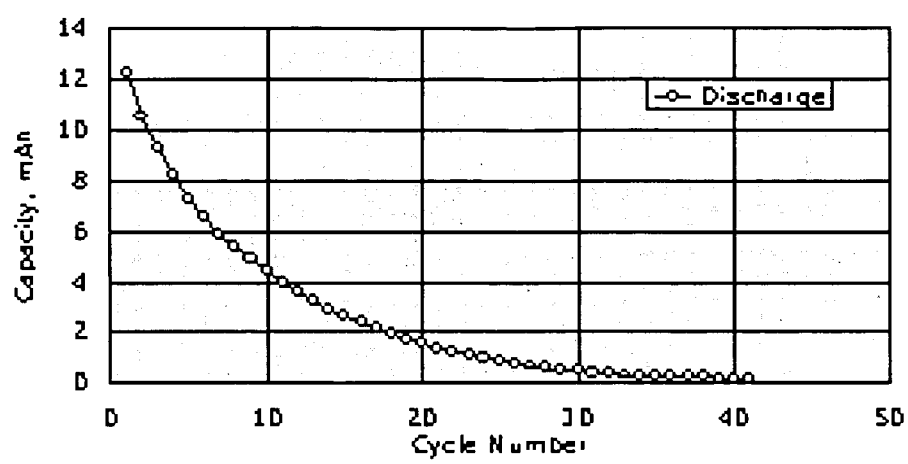
FIG. 8 is a graph of the capacity vs. cycle number of $LiFePO_4$/graphite cell at C/3 and 55° C. where it lost almost all its capacity after less than 50 cycles. The electrolyte used is 1.2 M $LiPF_6$ EC:PC:DMC (1:1:3).

FIG. 6 shows a typical charge-discharge voltage profile of carbon coated on $LiFePO_4$ (C-$LiFePO_4$) vs. a lithium metal counter at room temperature. The material cycles extremely well at C/3 rate with no capacity fade after 100 cycles. FIG. 7 shows the cycling characteristics of C-$LiFePO_4$ vs. MCMB graphite anode at both 25° C. and 55° C. At room temperature, the cell cycled very well with no capacity fade after 100 cycles. However, a significant capacity fade was observed when cycling the cell at 55° C. Similar results were also obtained when cycling a cell that comprised $LiFePO_4$ (without carbon coating) and graphite anode at 55° C. (FIG. 8).

Example 5

To understand the reason behind the significant capacity fade at 55° C., the stability of C-$LiFePO_4$ in the presence of electrolyte was investigated. An appropriate amount of C-$LiFePO_4$ powder was immersed in $LiPF_6$ in EC:PC:DMC (1:1:3) and was heated at 55° C. for 2 weeks. The solution was then filtered and was subjected to inductively coupled plasma mass spectrometry (ICP) analysis to look for traces of iron ions. After 2 weeks of aging the olivine C-$LiFePO_4$ powder in the $LiPF_6$ based electrolyte, over 535 ppm of $Fe^{2+}$ ions were detected in the electrolyte. The amount of iron dissolved increased with increasing temperature and time of aging. This result clearly confirms that Fe ions are dissolved in the electrolyte during cycling. However, the amount of active $LiFePO_4$ material associated with the small amount of iron dissolution is insignificant and could not account for the major capacity loss observed during cycling the cell at 55° C.

Figure 9:
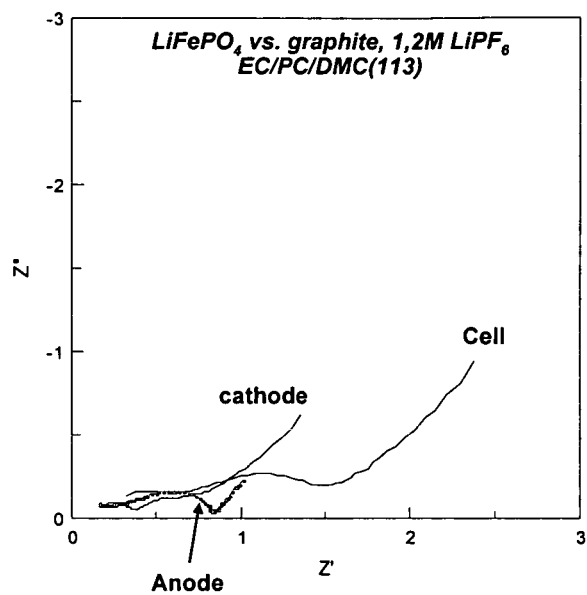
FIG. 9 shows the AC impedance of C-$LiFePO_4$/Graphite cell after the first cycle at 25° C. using a LiSn reference electrode with 1.2M $LiPF_6$/EC:PC:DMC (1:1:3) electrolyte. At this point, the impedance of the cathode is slightly larger than that of the anode.
Figure 10:
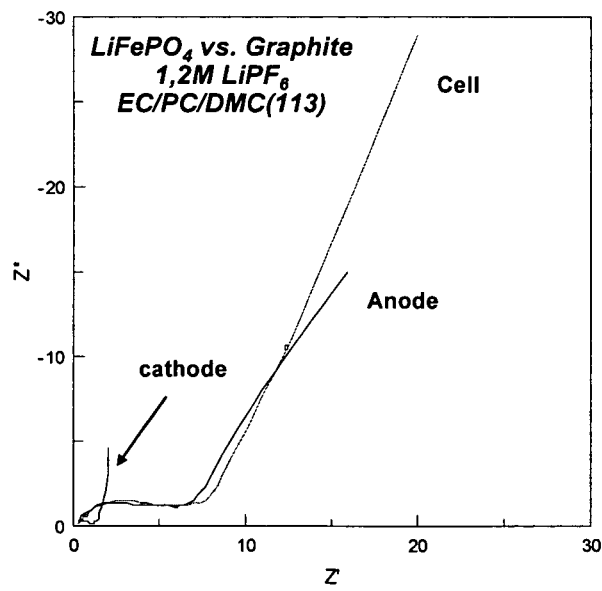
FIG. 10 shows that after cycling the C-$LiFePO_4$/Graphite cell with 1.2M $LiPF_6$/EC:PC:DMC (1:1:3) electrolyte at 55° C. for 50 cycles, the AC impedance analysis indicates the graphite negative electrode impedance has increased significantly.

To investigate the origin of the significant degradation of the graphite/LiFePO$_4$ cells during cycling at 55° C., the AC impedance of the cell during cycling at 55° C. was measured using a specially designed Li—Sn reference electrode. The results are shown in FIGS. 9 and 10. The AC impedance was measured after one formation cycle at room temperature (FIG. 9) and after 50 cycles at 55° C. (FIG. 10). At the initial stages of cycling, the impedance of the negative electrode and positive electrode are very similar; however, after 50 cycles at 55° C., the impedance of the negative electrode increased significantly and is almost 90% of the total cell impedance.

The graphite anode cycled in the Li-ion cell based on an olivine cathode at 55° C. was examined through EDS. The EDS spectrum (not shown) clearly showed the presence of iron metal on the graphite surface. It is thought that the dissolved Fe$^{2+}$ was reduced at the graphite surface, whose potential is ca. 0.06~0.1V vs. Li$^0$, and played a catalytic role in forming a film at the graphite surface, leading to the huge rise of interfacial impedance at the negative electrode.

Figure 11:
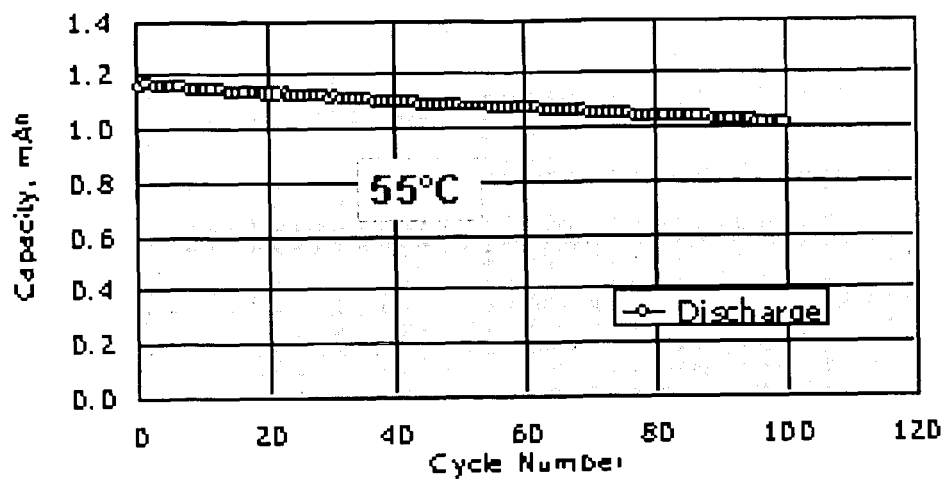
FIG. 11 is a graph of the discharge capacity vs. cycle number of C-$LiFePO_4$/$Li_4Ti_5O_{12}$ cell with 1.2M $LiPF_6$/EC:PC:DMC (1:1:3) electrolyte at C/3 and 55° C. indicates that the capacity fade is very limited because Fe ions are not reduced to Fe metal on the surface of the $Li_4Ti_5O_{12}$ anode that is at a voltage 1.5V which is its nominal voltage.

To prove this hypothesis, a cycling experiment was performed using a Li$_4$Ti$_5$O$_{12}$ spinel anode, whose nominal voltage is ca. 1.5V vs. Li$^0$. FIG. 11 shows the cycling performance of the Li$_4$Ti$_5$O$_{12}$/LiFePO$_4$ cell at 55° C. The result is that the Li$_4$Ti$_5$O$_{12}$/LiFePO$_4$ cell exhibited excellent capacity retention (80% after 100 cycles) compared with the graphite/LiFePO$_4$ cell. This can be attributed to the fact that the Fe$^{2+}$ remains in the electrolyte solution and is not reduced on the Li$_4$Ti$_5$O$_{12}$ surface, due to its high reduction potential.

Example 6

The present example shows that the performance of the of the olivine LiFePO$_4$ cell system can be improved by use of less acidic electrolyte salts. Of particular interest are lithium oxalatoborate (LiBoB), Li(C$_2$O$_4$)BF$_2$, and LiPF$_2$(C$_2$O$_4$)$_2$. Because these salts don't produce a strong acidic environment, the Fe$^{2+}$ dissolution should be significantly reduced or suppressed with such electrolytes. LiFePO$_4$ powders were stored at 55° C. for two weeks in both 0.7 M LiBoB in EC:PC:DMC (1:1:3) and in the 1.2M LiPF$_6$ in EC:PC:DMC (1:1:3). ICP was used to detect the amount of Fe$^{2+}$ in solution. As expected, only a negligible amount of Fe$^{+2}$ ions were detected from the solution taken from the powder that was aged in LiBoB based electrolyte (less than 3.7 ppm). By contrast, the LiPF$_6$ based electrolyte displayed a significant amount of Fe$^{+2}$ ions (535 ppm).

Figure 12:
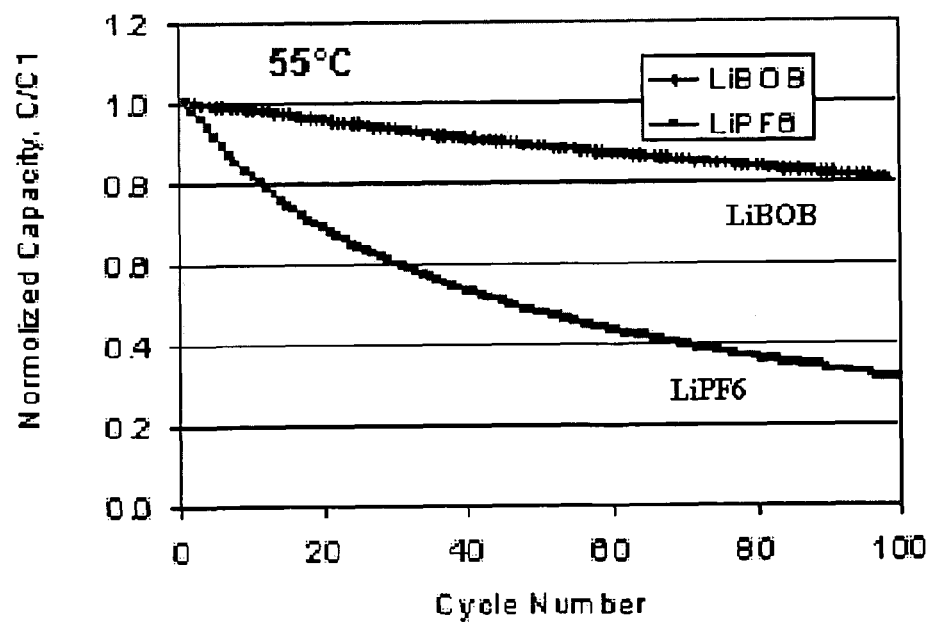
FIG. 12 is a graph of the C-$LiFePO_4$/graphite cell capacity vs. cycle number at C/3 and 55° C. using 0.7M LiBoB in EC:PC:DMC (1:1:3) and 1.2M $LiPF_6$ in EC:PC:DMC (1:1:3) electrolytes.

FIG. 12 compares the capacity fade of the C-LiFePO$_4$ versus graphite at 55° C. in the LiBoB in EC:PC:DMC (1:1:3) and LiFP$_6$ in EC:PC:DMC (1:1:3) electrolytes. The cycling performance of the graphite/C-LiFePO$_4$ cell with LiBoB-based electrolyte was remarkably improved at 55° C., which is consistent with the limited amount of iron leaching observed when using LiBoB electrolyte. These results indicate that the olivine appears to be much more stable in the LiBoB-based electrolyte than it is in the LiPF$_6$-based electrolyte.

Example 7

Figure 13:
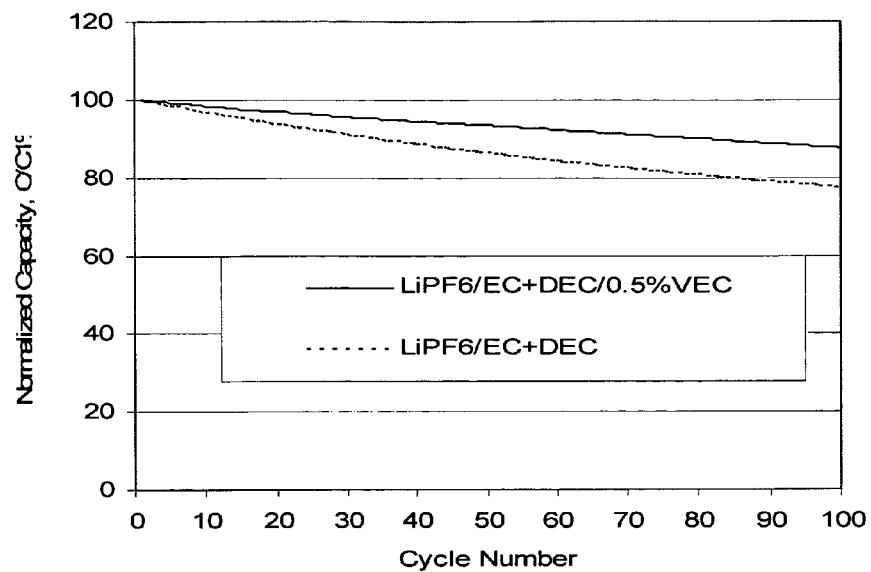
FIG. 13 is a graph of the $LiNi_{1/3}Co_{1/3}Mn_{1/3}O_2$/Graphite cell capacity vs. cycle number at 55° C. with 0.5 wt % vinylethylene carbonate added to the electrolyte.
Figure 14:
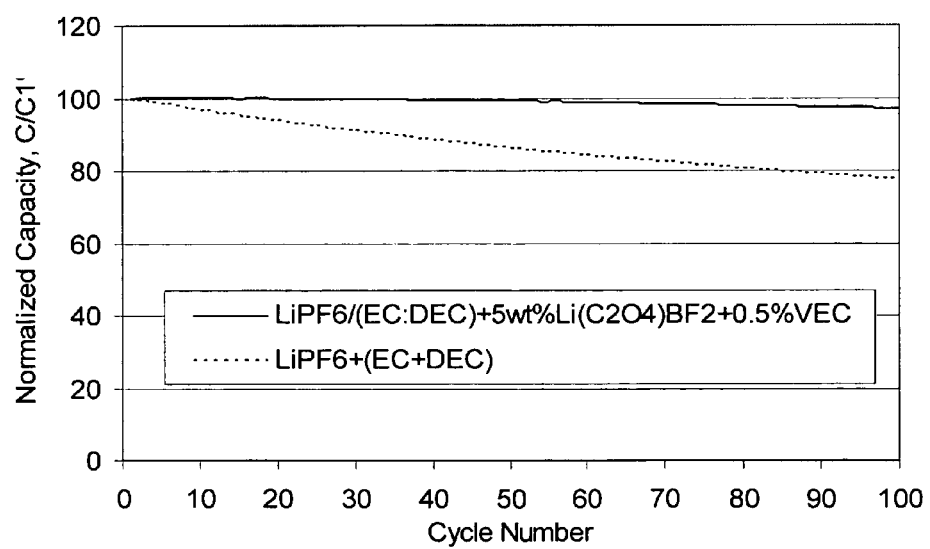
FIG. 14 is a graph of the $LiNi_{1/3}Co_{1/3}Mn_{1/3}O_2$/Graphite cell capacity vs. cycle number at 55° C. with 0.5 wt % vinylethylene carbonate and 5 wt % $Li(C_2O_4)BF_2$ added to the electrolyte.

FIG. 13 is a graph of the LiNi$_{1/3}$Co$_{1/3}$Mn$_{1/3}$O$_2$/Graphite cell capacity vs. cycle number at 55° C. with 0.5 wt % vinyl-ethylene carbonate (VEC) added to the electrolyte. The addition of 0.5 wt % VEC to the electrolyte dramatically improves the cell capacity performance as a function of cycle number as opposed to cells without the additive. Further improvement is observed when 5 wt % of Li(C$_2$O$_4$)BF$_2$ is added to an electrolyte that contains 0.5% VEC as is shown in FIG. 14. It is believed that the improvements are a result of the formation of a protective film on the surface of both the positive and the negative electrodes, by the vinyl-substituted compound and Li(C$_2$O$_4$)BF$_2$. The protective film is believed to improve the surface stability of both electrodes against electrolyte reactivity.

While certain embodiments have been illustrated and described, it should be understood that changes and modifications can be made therein in accordance with one of ordinary skill in the art without departing from the invention in its broader aspects. Various features of the invention are defined in the following claims.

We claim:

1. An electrolyte comprising:
   Li[(C$_2$O$_4$)BF$_2$], [LiPF$_2$(C$_2$O$_4$)$_2$], or a mixture thereof;
   a polar aprotic solvent; and
   an electrode stabilizing additive, capable of forming a passivating film on the surface of an electrode;
   wherein:
   the electrode stabilizing additive is a substituted or unsubstituted linear, branched or cyclic hydrocarbon, other than a spirocyclic hydrocarbon, comprising at least one oxygen atom and at least one aryl, alkenyl or alkynyl group; and
   the electrolyte is substantially non-aqueous.

2. The electrolyte of claim 1, wherein the electrode stabilizing additive contains 1, 2, 3, 4, 5, or 6 oxygen atoms.

3. The electrolyte of claim 1, wherein the electrode stabilizing additive has 1 or 2 alkenyl groups.

4. The electrolyte of claim 1, wherein the electrode stabilizing additive is a cyclic hydrocarbon.

5. The electrolyte of claim 1, wherein the electrode stabilizing additive is a linear or branched hydrocarbon.

6. The electrolyte of claim 1, wherein the electrode stabilizing additive comprises one or two substituted or unsubstituted aryloxy groups.

7. The electrolyte of claim 1, wherein the electrode stabilizing additive is vinyl ethylene carbonate, divinyl ethylene carbonate, vinyl carbonate, divinyl carbonate, vinyl crotonate, aryloxycrotonate, 2,4-divinyl isooxazole, 3,5-divinyl furoate, 2,4-divinyl-1,3-dioxane, divinyl crotonate, divinylpyrazine, vinyl ethylene silicate, aryloxy-ethylene silicate, divinyl ethylene silicate, vinyl ethylene sulfate, aryloxy ethylene sulfate, divinyl ethylene sulfate, 2-vinyloxy-cyclopropanone, vinylethylene oxide, vinylcylopropanone, 3-vinyloxetane, 3-vinyltetrahydrofuran, 4-vinyltetrahydropyran, 3-vinylcyclobutanone, β-vinyl-γ-butyrolactone, dihydropyran-3-one, 2-amino-4-vinylcyclobutanone, 3-vinylaziridin-2-one, 3-vinyloxaziridine, 2-amino-3-vinylcyclopropanone, 2-amino-5-vinylcyclopentanone, 3-vinylazetidin-2-one, 3-vinylcyclopentanone, 5-vinylpiperidin-3-one, 2-amino-3-vinylcyclohexanone, 1-vinylazetidin-2-one, 3-(N -vinylamino)cyclohexanone, 2-vinyl[1,2]oxazetidine, 3-vinylpyrrolidin-2-one, 1-vinylpyrrolidin-2-one, 1-vinylpiperidin-2-one, 2-vinylaminocyclopropanone, 1,-vinylaziridin-2-one, oxiranylvinylamine, oxetan-2-yl-vinylamine, (tetrahydro-furan-2-yl) -vinylamine, 2-vinylaminocyclohexanol, 2-aryloxy-cyclopropanone, divinyl phenyl carbonate, aryloxy-phenyl carbonate, vinyl methacrylate, aryloxy-methacrylate, diphenyl divinyl silicate, divinyl furan, 4,4-divinyl-3-dioxolan-2-one, vinyl-2-furoate, aryloxy-2-furoate, divinyl propylene carbonate, divinyl butyl carbonate, divinyl ether, 1,3-butadiene carbonate, divinyl diphenyl ether, diaryloxy-diphenyl ether, vinyl ethylene sulfite, aryloxy-ethylene sulfite, divinyl ethylene sulfite, diaryloxy-ethylene sulfite, 4-allylanisole, divinyl methylphosphate, 1,2-divinyl furoate, allylglycidyl ether, butadiene monoxide, vinyl phosphate, aryloxy-phosphate, vinyl cyclopentanone, aryloxy cyclopentanone, vinyl methyl carbonate-allylanisole, methyl phosphate, ethyl phosphate, vinyl ethyl-2-furoate, aryloxy-ethyl-2-furoate, divinyl methoxypyrazine, aryloxy pyrazine, vinylmethoxy pyrrole, aryloxpyrrole, butyl vinyl ether, butyl-aryloxy-ether, divinyl methoxybipyridine, methoxy-o-terphenyl, aryloxy-o-terphenyl, 3,4-divinyl-1-methyl pyrrole, methoxy-4-vinylbiphenyl, 1-divinylimidazole, vinyl methoxy imidazole, aryloxyimidazole, methoxy carbazole, aryloxy-carbazole, vinyl methoxy carbazole, aryloxy-carbazole trivinylphosphate, vinyl-tetrahydrofuran, aryloxy-tetrahydrofuran, 2-vinyloxetane, aryloxyoxetane, divinyl methoxy furan, diaryloxy-furan, vinyl pyridazine, aryloxy -pyridazine, vinyl methoxyquinoline, aryloxy-quinoline, vinyl methoxy piperidine, aryloxy-piperidine, vinyl methoxypyrazine, (vinyl)(methoxy)(tetrafluoro)cyclotriphosphazene, (aryloxy)(tetrafluoro)(methoxy)cyclotriphosphazene, (divinyl)(methoxy)(trifluoro)cyclotriphosphazene, (diaryloxy)(trifluoro)(methoxy)cyclotriphosphazene, (trivinyl)(difluoro)(methoxy)cyclotriphosphazene, diphenyl ether, diphenyl silicate, diphenyl carbonate, 2,4-dimethyl-6-hydroxy-pyrimidine, or a mixture of any two or more thereof.

8. The electrolyte of claim 1, wherein the electrode stabilizing additive is present in an amount of about 0.0005 to about 50 wt %.

9. The electrolyte of claim 1, wherein the electrode stabilizing additive is present in an amount of about 0.0005 to about 2 wt %.

10. The electrolyte of claim 1 further comprising an alkali metal salt selected from the group consisting of: $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, a lithium alkyl fluorophosphate, and a mixture of any two or more thereof.

11. The electrolyte of claim 1, wherein the polar aprotic solvent is ethyl acetate, propyl acetate, ethylene carbonate, propylene carbonate, dimethyl carbonate, diethyl carbonate, ethyl methyl carbonate, diethyl ether, methyl-acetate gamma-butyrolactone, sulfolane, or a mixture of any two or more thereof.

12. An electrolyte comprising:
    $Li[(C_2O_4)BF_2]$, $[LiPF_2(C_2O_4)_2]$, or a mixture of any two or more thereof;
    a polar aprotic solvent; and
    an electrode stabilizing additive, capable of forming a passivating film on the surface of an electrode;
    wherein the electrode stabilizing additive is a substituted aryl or a substituted or unsubstituted heteroaryl, comprising at least one oxygen atom; and
    wherein the electrolyte is substantially non-aqueous.

13. The electrolyte of claim 12, wherein the electrode stabilizing additive is substituted with one or two alkenyl groups.

14. The electrolyte of claim 12, wherein the electrode stabilizing additive is a substituted phenyl, naphthyl, or anthracenyl compound; or a substituted or unsubstituted pyrrolyl, oxazolyl, furanyl, indolyl, carbazolyl, imidazolyl, or thiophenyl compound.

15. The electrolyte of claim 12, wherein the electrode stabilizing additive is diaryloxy-propylene carbonate, aryloxy-pyrrole, aryloxy-crotonate, diaryloxy-crotonate, aryloxy-ethylene silicate, diaryloxy-ethylene silicate, aryloxy-ethylene sulfate, diaryloxy-ethylene sulfate, Aryloxy-cyclopropanone, 2-aryl-cyclopropanone, divinyl phenyl carbonate, diaryloxy-phenyl carbonate, aryloxy-methacrylate, diphenyl divinyl silicate, diphenyl diaryloxy silicate, diaryloxy furan, aryloxy-2-furoate, diaryloxy ethylene carbonate, diaryloxy-propylene carbonate, diaryloxy-butyl carbonate, divinyl methoxydiphenyl ether, diaryloxy-diphenyl ether, aryloxy-ethylene sulfite, diaryloxyethylene sulfite, 4-allylanisole, aryloxy-phosphate, aryloxy-cyclopentanone, diaryloxy- cyclotriphosphazene, aryloxy-cycolophosphazene, 1,2-divinyl furoate, 2-diaryloxy-furoate, vinyl methoxyquinoline, aryloxy-quinoline, divinyl methyl phosphate, diaryloxy methyl phosphate, aryloxy-cyclobutane, vinyl methoxy imidazole, aryloxy-imidazole, methoxycarbazole, aryloxy- carbazole, diaryloxy-ethyl silicate, diphenyl ether, diphenyl silicate, diphenyl carbonate, or 2,4-dimethyl-6-hydroxy-pyrimidine, or a mixture of any two or more thereof.

16. An electrolyte consisting essentially of:
    a lithium metal salt other than $Li[(C_2O_4)BF_2]$, or $LiPF_2(C_2O_4)_2$;
    a polar aprotic solvent; and
    a first electrode stabilizing additive comprising $Li[(C_2O_4)BF_2]$, or $LiPF_2(C_2O_4)$
    a second electrode stabilizing additive configured to form a passivating film on the surface of an electrode;
    wherein the second electrode stabilizing additive is a substituted or unsubstituted linear, branched or cyclic hydrocarbon, other than a spirocyclic hydrocarbon, comprising at least one oxygen atom and at least one aryl, alkenyl or alkynyl group; and
    wherein the electrolyte is substantially non-aqueous.

17. The electrolyte of claim 16, wherein the lithium metal salt is $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof.

18. The electrolyte of claim 16, wherein the second electrode stabilizing additive is a substituted organoamine, alkane, or alkene compound.

19. The electrolyte of claim 12 further comprising an alkali metal salt selected from the group consisting of: $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, a lithium alkyl fluorophosphate, and a mixture of any two or more thereof.

* * * * *